United States Patent [19]
Fushiya

[11] 3,922,785
[45] Dec. 2, 1975

[54] SAFETY DEVICES FOR ELECTRIC CIRCULAR SAWS

[75] Inventor: Fusao Fushiya, Nagoya, Japan

[73] Assignee: Makita Electric Works Limited, Aichi, Japan

[22] Filed: Nov. 12, 1974

[21] Appl. No.: 523,100

[30] Foreign Application Priority Data
Nov. 15, 1973 Japan.............................. 48-128533

[52] U.S. Cl..................................... 30/391; 83/478
[51] Int. Cl.² ......................................... B27G 19/04
[58] Field of Search ............ 30/166, 276, 286, 382, 30/390, 391; 83/397, 478, 860

[56] References Cited
UNITED STATES PATENTS

| | | | |
|---|---|---|---|
| 1,811,577 | 6/1931 | Crowe.................................. | 30/391 |
| 2,228,664 | 1/1941 | Knouse................................ | 30/391 |
| 2,722,246 | 11/1955 | Arnoldy............................... | 30/391 |
| 3,131,277 | 4/1964 | Brenzen........................... | 30/382 X |
| 3,613,748 | 10/1971 | De Pue................................ | 30/391 |

FOREIGN PATENTS OR APPLICATIONS

| | | | |
|---|---|---|---|
| 1,056,355 | 4/1959 | Germany .............................. | 30/391 |

Primary Examiner—Al Lawrence Smith
Assistant Examiner—J. C. Peters
Attorney, Agent, or Firm—Irvin A. Lavine

[57] ABSTRACT

An improved safety device for an electrically driven hand operated circular saw is disclosed. The device comprises an auxiliary switch connected in series to a main switch in an electric circuit between a power source and a motor for driving a saw blade, and a mechanism operationally connecting the auxiliary switch with a rotatable safety cover. According to one embodiment, the mechanism comprises a shaft and a lever secured to each end of the shaft. One of the levers is maintained in frictional contact with the safety cover for rotation therewith to simultaneously cause rotation of the shaft and the other lever. The other lever is associated with the auxiliary switch to break circuit continuity therethrough to discontinue rotation of the saw blade upon rotation of the safety cover in the direction in which it conceals the saw blade.

10 Claims, 5 Drawing Figures

SAFETY DEVICES FOR ELECTRIC CIRCULAR SAWS

This invention relates to improvements in the safety device for an electrically driven hand operated circular saw.

A known electrically driven hand operated circular saw is provided with a rotatable safety cover adapted to expose a saw blade when it is in use, but conceal it when not in use. The saw blade is driven by a motor which is actuated by turning on a switch. It is necessary to turn off the switch whenever it is desired to stop rotation of the saw blade. The safety cover is urged toward its closed position by a tension spring. But there is some delay before the safety cover completely conceals the saw blade. The saw blade continues rotating during this delay unless the switch is turned off. Such continued rotation of the saw blade is very dangerous to the operator and may also give damage to any adjacent object. To avoid such danger or damage, it is imperative to interrupt the rotation of the saw blade immediately upon completion of the sawing operation or whenever it is otherwise desired to keep the saw blade out of operation. For instance, there may often occur a sudden lift of the saw from the work during the sawing operation as the result of a sudden increase in the resistance which the saw blade receives from the work. Such increase in the resistance to the saw blade may be caused by an undue increase in the frictional resistance between the saw blade and the work, or when the saw blade has come across a knot in timber. The operator may sometimes be tardy in turning off the switch and leave the saw blade rotating. Moreover, it is possible that the switch may be turned on unintentionally when it is contacted by any adjacent object by chance. Therefore, it is necessary to develop an improved device which ensures an additional safety to the operator of an electrically driven hand operated circular saw.

It is an object of this invention to provide, in combination with a rotatable safety cover for a circular saw blade on an electrically driven hand operated circular saw, an improved safety device which can interrupt rotation of the saw blade even if a switch for a driving motor remains in its operative position, whenever desired to ensure an increased safety of the operator before, after or during the operation of the saw.

According to this invention, there is provided, in combination with a safety device for an electrically driven hand operated circular saw, wherein a safety cover for a circular saw blade is provided rotatably in one direction to expose the saw blade and in the opposite direction to conceal the saw blade, and wherein means is provided for urging the safety cover in the opposite direction, the improvement which comprises: an auxiliary switch connected in series to a main switch in an electric circuit between a power source and a motor for driving the saw blade; and means operationally associated with the safety cover and the auxiliary switch for maintaining the auxiliary switch in its operative position during rotation of the safety cover in the one direction, but turning the auxiliary switch into its inoperative position upon rotation of the safety cover in the opposite direction.

DESCRIPTION OF THE DRAWINGS

Referring to FIG. 1 of the drawings, there is generally shown a portable electrically driven circular sawing machine 5 having a circular saw blade 3 rotatably supported in a housing 2 and adapted to be driven by a series commutator motor 1 in a motor casing to cut the work 20 which is applied onto the underside of a surface plate 4. The motor casing includes a handle 6 and a main switch 7 is provided on the upper portion of the handle 6. The saw blade 3 is rotatable about a shaft 3a and substantially the lower half of the saw blade 3 projects below the underside 4c of the surface plate 4. A safety cover 8 is rotatably supported about the shaft 3a to enclose the lower half of the saw blade 3. A tension spring 9 is attached to the housing 2 at one end 9a and the safety cover 8 at the other end 9b. The tension spring 9 urges the safety cover 8 in a counterclockwise direction as viewed in FIG. 1, so that the safety cover 8 encloses the lower half of the saw blade 3 while the machine 5 is not in use. The safety cover 8 is generally semi-circular in shape and has a flat upper edge 8a which is slidable on the surface of the work 20 as the saw blade 3 is moved forward to cut the work 20. A stopper 18 is provided in the housing 2 to prevent the safety cover 8 from being rotated counterclockwise beyond its position shown in FIG. 1 by the action of the tension spring 9 when the machine 5 is not in use. As shown in FIG. 1, the upper edge 8a of the safety cover 8 is in abutment against the stopper 18 to prevent any further counterclockwise rotation of the safety cover 8. The underside 4c of the front end 4a of the surface plate 4 is placed on the upper surface 24 of the work 20 and the machine 5 is moved forward. The front end 8b of the safety cover 8 abuts against the end surface 22 of the work 20. As the machine 5 is further advanced, the safety cover 8 is rotated clockwise as viewed in FIG. 1 against the action of the tension spring 9 and gradually exposes the lower half of the saw blade 3. When the safety cover 8 is rotated by about 90° from its initial position shown in FIG. 1, its upper edge 8a engages the end surface 22 of the work 20. The safety cover 8 is further rotated until it completes clockwise rotation by about 180° from its initial position, whereupon its upper edge 8a rests on the upper surface 24 of the work 20. As the sawing operation further proceeds, the upper edge 8a of the safety cover 8 is caused to slide on the upper surface 24 of the work 20, while it is pressed against the upper surface 24 by the force of the tension spring 9 to hold the work 20 in place. When the safety cover 8 leaves the work 20 upon completion of the sawing operation, the tension spring 9 causes the safety cover 8 to rotate counterclockwise (in FIG. 1) and the safety cover 8 returns to its initial position to enclose the lower half of the saw blade 3 as shown in FIG. 1.

Figure 1:
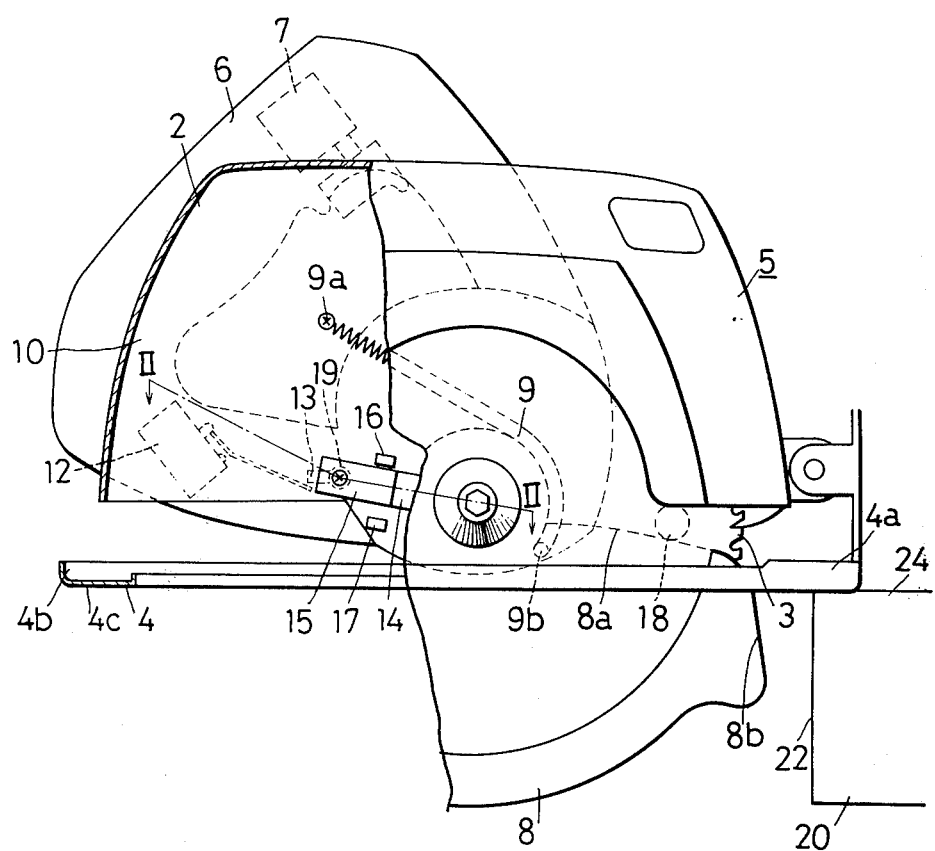
FIG. 1 is a side view of the saw with part of the housing and safety cover cut away.
Figure 2:
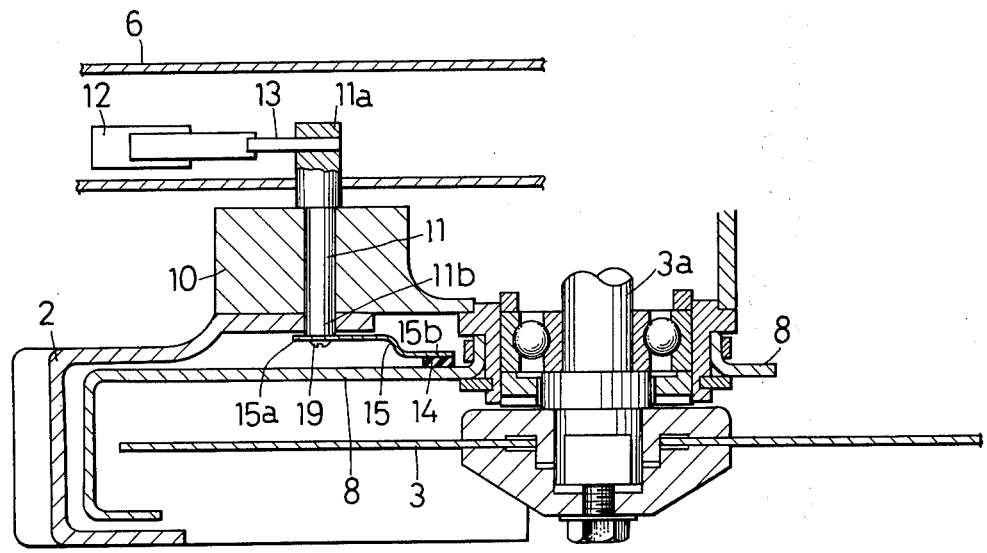
FIG. 2 is a sectional view taken along line II — II of FIG. 1.

According to this invention, a shaft 11 is provided in a gear housing 10 and is rotatable about its own axis. The shaft 11 extends into the handle 6 at one end 11a and into the saw blade housing 2 at the other end 11b as shown in FIG. 2. A limit switch 12 is provided in the lower portion of the handle 6. A lever 13 is carried on the one end 11a of the shaft 11 in proximity to the limit switch 12. The limit switch 12 has a normally open contact and an actuating arm engageable with the contact to establish circuit continuity through the limit switch 12. The free end of the lever 13 is normally positioned away from the actuating arm of the limit switch 12 as illustrated in FIG. 1, but is adapted to engage the arm of the limit switch 12 with the rotation of the shaft 11 in a counterclockwise direction as viewed in FIG. 1. In the saw blade housing 2, another lever 15 is secured at one end 15a to the other end 11b of the shaft 11 by a screw 19 and extends along the safety cover 8. The lever 15 is preferably made of a leaf spring. A member 14 of elastic material is interposed between the other or free end 15b of the lever 15 and the safety cover 8. A rubber piece is used as the elastic member 14 in the embodiment being described. The rubber piece 14 is secured to the free end 15b of the lever 15, while it is frictionally engaged with the safety cover 8, so that when the safety cover 8 is rotated in one direction, the lever 15 is rotated in the opposite direction. When the front end 8b of the safety cover 8 is engaged with the end surface 22 of the work 20 to start the sawing operation, the safety cover 8 is rotated clockwise as viewed in FIG. 1, whereupon the lever 15 is caused to move counterclockwise in FIG. 1 because of its elasticity and the frictional contact of the rubber piece 14 with the safety cover 8. Accordingly, the shaft 11 is rotated counteclockwise and the lever 13 secured to the one end 11a of the shaft 11 is also moved counterclockwise to engage the actuating arm of the limit switch 12 and thereby close the normally open contact thereof.

A pair of stoppers 16 and 17 project from the inner wall of the saw blade housing 2 and the lever 15 is interposed between the two stoppers 16 and 17 in a mutually spaced relationship. As it is rotated counterclockwise about the shaft 11, the lever 15 abuts against the upper stopper 16 and does not rotate any longer. Despite the frictional contact existing between the rubber piece 14 and the outer wall of the safety cover 8, the safety cover 8 slips past the rubber piece 14 and continues to rotate clockwise until the upper edge 8a rests on the upper surface 24 of the work 20. The safety cover 8 does not rotate any more, but merely slides on the upper surface 24 of the work 20 throughout the rest of the sawing operation. Upon completion of the sawing operation, the safety cover 8 rotates counterclockwise and the lever 15 is caused to move clockwise to thereby rotate the shaft 11 clockwise. Upon clockwise rotation of the shaft 11, the lever 13 is disengaged from the actuating arm of the limit switch 12 and the limit switch 12 returns to its normally open position. As the lever 15 is rotated clockwise, it abuts against the lower stopper 17 and is prevented thereby from rotating any more. Nevertheless, the safety cover 8 slips past the rubber piece 14 and continues to rotate counterclockwise until it abuts against the stopper 18 and is maintained in that position by the action of the tension spring 9 to enclose the lower half of the saw blade 3 as illustrated in FIG. 1.

Figure 3:
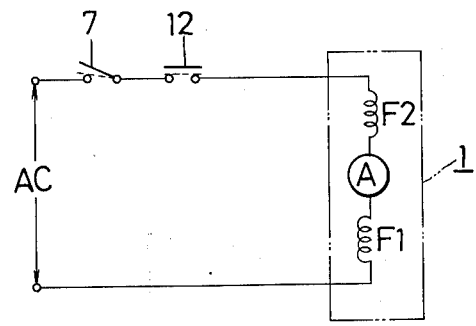
FIG. 3 is a schematic diagram of the electrical circuit.

Referring to FIG. 3, the series commutator motor 1 comprises an armature A and a pair of series field windings F1 and F2 connected in series to the armature A. The limit switch 12 is connected in series to the main switch 7 and the motor 1 is connected to a power source AC via the main switch 7 and the limit switch 12.

In operation, the main switch 7 is turned on as indicated by a broken line in FIG. 3, and the front end 4a of the surface plate 4 is applied onto the rear edge of the upper surface 24 of the work 20 as illustrated in FIG. 1. In the position shown in FIG. 1, however, the limit switch 12 is still in its open position as shown by a solid line in FIG. 3. Accordingly, no circuit continuity is established between the motor 1 and the power source AC, and the motor 1 does not start to drive the saw blade 3. The machine 5 is then advanced and the front end 8b of the safety cover 8 abuts against the end surface 22 of the work 20. As the machine 5 is moved forward, the front end 8b of the safety cover 8 slides down the end surface 22 of the work 20 and the safety cover 8 is caused to rotate clockwise as viewed in FIG. 1. The safety cover 8 causes the lever 15 to move counterclockwise and the shaft 11 rotates counterclockwise to move down the lever 13 into engagement with the actuating arm of the limit switch 12. The limit switch 12 is turned to its closed position as indicated by a broken line in FIG. 3. This establishes circuit continuity between the power source AC and the motor 1. The motor 1 is placed in operation and the saw blade 3 starts rotating at an appropriate operating speed. With a slight further forward movement of the machine 5, the saw blade 3 is brought into contact with the work 20 and cuts it in a well known fashion.

As the sawing operation proceeds, the torque loaded on the saw blade 3 may suddenly increase for some reason or other, such as its abutment against a knot in timber and an undue increase in the frictional resistance between the saw blade 3 and the work or timber 20. Such sudden increase in the torque will cause a sudden lift of the machine 5 at the rear end 4b of the surface plate 4 against the force being applied by the operator to the machine 5. The lift of the machine 5 allows the safety cover 8 to move back to some extent in a counterclockwise direction as viewed in FIG. 1. Simultaneously, the lever 15 is moved clockwise about the shaft 11, and the shaft 11 rotated in the same direction to disengage the lever 13 from the actuating arm of the limit switch 12. The limit switch 12 returns to its open position and the motor 1 ceases to be supplied with an electric current. Although the motor 1 would otherwise tend to continue rotating by inertia, the resistance existing on the saw blade 3 overcomes such inertia to thereby immediately stop the rotation of the motor 1, hence of the saw blade 3, whereby the operator will be protected against any possible hazard that might otherwise occur. The machine 5 is placed in operation again after the resistance encountered by the saw blade 3 has been overcome. The surface plate 4 is brought back into its normal operative position relative to the work 20, whereupon the safety cover 8 is moved back clockwise and the lever 13 is moved counterclockwise into engagement with the actuating arm of the limit switch 12 again to actuate the limit switch 12 and thereby place the saw blade 3 in operation again.

The sawing operation is thus continued very safely and when the saw blade 3 has finished cutting the work or timber 20, the torque or resistance acting upon the saw blade 3 undergoes a sudden decrease. This decrease in the resistance to the saw blade 3 causes a sudden lift of the machine 5 at the front end 4a of the surface plate 4 against the force being applied to the machine 5 by the operator. In other words, the machine 5 rotates upward about the rear end 4b of the surface plate 4 and a wedge-shaped clearance is created between the underside 4c of the surface plate 4 and the upper surface 24 of the work 20. The clearance thus formed allows the safety cover 8 to rotate counterclockwise (in FIG. 1) to such an extent that the limit switch 12 is brought back to its open position, and the supply of the electric current to the motor 1 shut down, all in the manner as hereinbefore described. Although the motor 1 would otherwise tend to continue rotation by inertia, the saw blade 3 is still subject to some resistance as it is still retained in part between the two split portions of the work 20. Accordingly, the saw blade 3 ceases to rotate immediately upon interruption of rotation of the motor 1, whereby the operator will be protected against any possible hazard that may otherwise occur.

Figure 4:
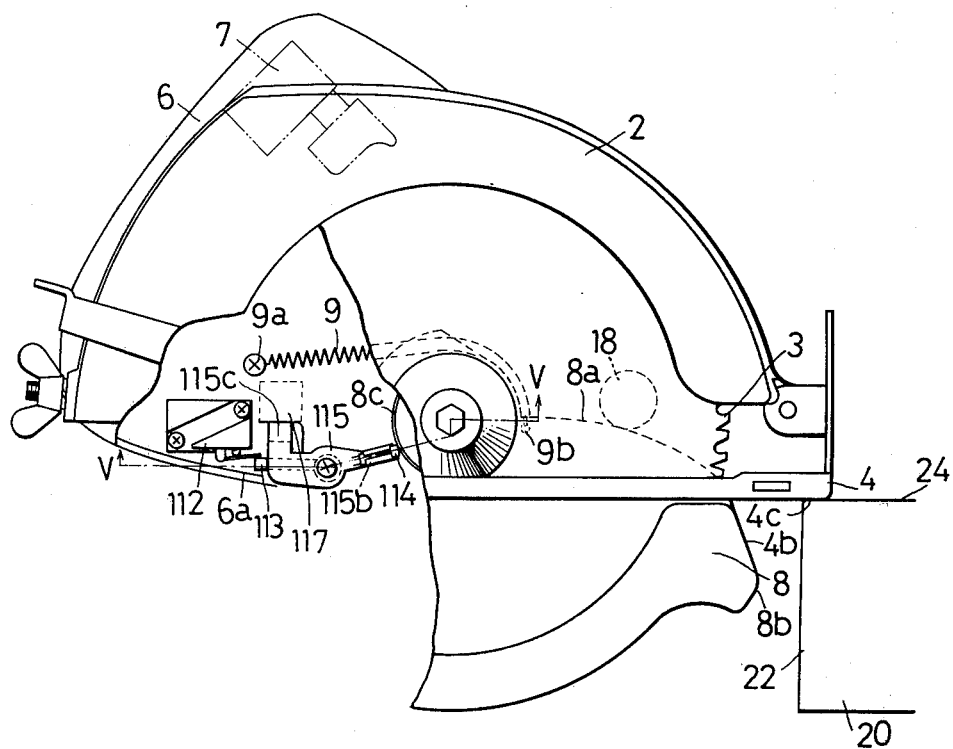
FIG. 4 is a side view of another embodiment with part of the housing and safety cover cut away.
Figure 5:
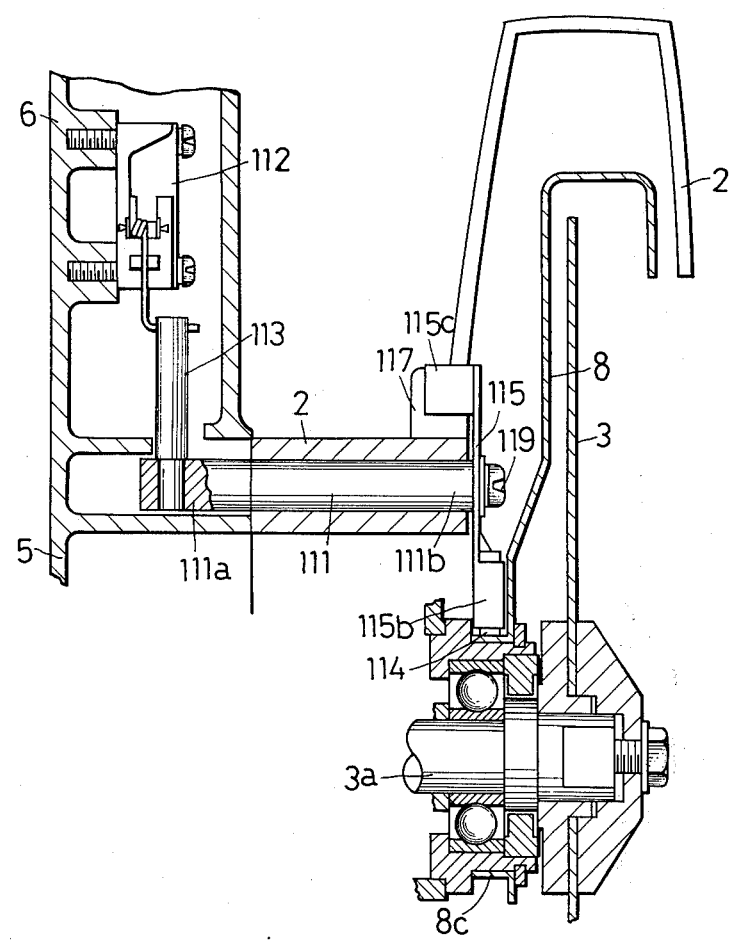
FIG. 5 is a sectional view taken along line V — V of FIG. 4.

Another embodiment of this invention will be described with reference to FIGS. 4 and 5, in which the same reference numerals as used in FIGS. 1 through 3 are used to indicate like parts to avoid the necessity for repeating the relevant description. A shaft 111 is rotatably supported on a saw blade housing 2 for a portable, electrically operated circular sawing machine 5. One end 111a of the shaft 111 extends into a handle 6 and the other end 111b thereof into the saw blade housing 2, as shown in FIG. 5. A limit switch 112 is provided in the lower portion of the handle 6. A pin 113 is carried on the one end 111a of the shaft 111 and extends toward the limit switch 112. The limit switch 112 has a normally open contact and an actuating arm disengageably engaged with the contact. Circuit continuity is established upon disengagement of the actuating arm from the contact. The free end of the pin 113 is normally engaged with the actuating arm of the limit switch 112 as shown in FIG. 4 to maintain the limit switch 112 in its open position. The pin 113 is, however, disengageable from the actuating arm of the limit switch 112 with the rotation of the shaft 111 in a counterclockwise direction as viewed in FIG. 4. In the saw blade housing 2, a lever 115 is secured in its mid-portion to the other end 111b of the shaft 111 by a screw 119 and extends along the outer surface of a safety cover 8. The safety cover 8 includes a circular flange 8c encircling a shaft 3a on which a circular saw blade 3 is supported. The lever 115 is generally L-shaped and made of flat steel. One end 115b of the lever 115 extends toward the circular flange 8c of the safety cover 8 and terminates in a hollow cylindrical portion. A member of elastic material is tightly held in the hollow cylindrical end portion 115b of the lever 115 and projects outwardly therefrom. A rubber pin 114 is used in the embodiment now being described. At its outwardly projecting end, the rubber pin 114 is maintained in frictional contact with the outer surface of the flange 8c of the safety cover 8. The other end 115c of the lever 115 extends in a generally perpendicular fashion relative to the one end 115b thereof and terminates in a lateral projection which rests against a stopper 117 laterally and outwardly projecting from the lower edge of the saw blade housing 2, while the limit switch 112 is in its open position.

In operation, the machine is moved forward and the front end 8b of the safety cover 8 abuts against the end surface 22 of the work 20. The safety cover 8 is caused to rotate clockwise as viewed in FIG. 4 against the action of a tension spring 9. This rotation of the safety cover 8 causes the lever 115 to rotate counterclockwise because of the frictional contact maintained between the flange 8c and the rubber pin 114. The shaft 111 is simultaneously rotated counterclockwise and causes the pin 113 to move down and disengage from the actuating arm of the limit switch 112, whereupon circuit continuity is estabished through the limit switch 112 and the saw blade 3 starts rotating. Although the safety cover 8 continues rotating clockwise as the sawing operation proceeds, the shaft 111 soon ceases to rotate as the pin 113 abuts against the inner bottom wall 6a of the handle 6, while the limit switch 112 is maintained in its operative position. The lever 115 also ceases to rotate, but the safety cover 8 continues to rotate clockwise as its circular flange 8c slips past the rubber pin 114 on the lever 115. The rotation of the safety cover 8 continues until its upper edge 8a rests upon the upper surface 24 of the work 20 after it has made about half a turn around the shaft 3a. The safety cover 8 does not rotate any more, but merely slides on the work 20 during the rest of the sawing operation.

When the saw blade 3 has finished cutting the work 20, the torque or resistance acting upon the saw blade 3 is suddenly decreased. This decrease in the resistance to the saw blade 3 causes a sudden lift of the machine 5 at the front end 4a of the surface plate 4 against the force being applied to the machine 5 by the operator. An outwardly enlarging clearance is provided between the underside 4c of the surface plate 4 and the upper surface 24 of the work 20 to allow the safety cover 8 to rotate counterclockwise as viewed in FIG. 4. The frictional contact maintained between the circular flange 8c and the rubber pin 114 causes the lever 115 to move clockwise and the shaft 111 to rotate in the same direction. This rotation of the shaft 111 causes the pin 113 to move up clockwise and engage the actuating arm of the limit switch 112, whereupon the limit switch 112 is turned to its open position. The pin 113 ceases to move clockwise soon as the upper end 115c of the lever 115 abuts against the stopper 117. The lever 115 ceases to rotate despite continued rotation of the safety cover 8. The circular flange 8c of the safety cover 8 slips past the rubber pin 114 and the safety cover 8 continues to rotate counterclockwise until it abuts against the stopper 18 in the saw blade housing 2. The safety cover 8 encloses the lower half of the saw blade 3 as illustrated in FIG. 4, and is maintained in that position by the action of the tension spring 9.

While the invention has been described with reference to a couple of embodiments thereof, it is to be understood that further modifications or variations may easily be made by those skilled in the art without departing from the scope of this invention which is defined by the appended claims.

What is claimed is:

1. In combination with a safety device for an electrically driven hand operated circular saw, wherein a safety cover for a circular saw blade is provided rotatably in one direction to expose said saw blade and in the opposite direction to conceal said saw blade, and wherein means is provided for urging said safety cover in said opposite direction, the improvement which comprises:

an auxiliary switch connected in series to a main switch in an electric circuit between a power source and a motor for driving said saw blade; and
means operationally associated with said safety cover and said auxiliary switch for maintaining said auxiliary switch in its operative position during rotation of said safety cover in said one direction, but turning said auxiliary switch into its inoperative position upon rotation of said safety cover in said opposite direction.

2. The invention of claim 1 wherein said auxiliary switch is a limit switch adapted to turn into said operative position when engaged by said last named means upon said rotation of said safety cover in said one direction.

3. The invention of claim 1 wherein said auxiliary switch is a limit switch adapted to turn into said operative position when said last named means is disengaged from said limit switch upon said rotation of said safety cover in said one direction.

4. The invention of claim 2 wherein said last named means comprises:
 a shaft supported by a gear housing on said saw rotatably about its own axis;
 a first lever secured at one end to one end of said shaft for rotation therewith;
 a second lever secured at one end to the other end of said shaft for rotation with said safety cover in a direction opposite thereto, said second lever extending in a generally diametrically opposite direction from said first lever with respect to said shaft;
 a member of elastic material secured to the other end of said second lever and maintained in frictional contact with said safety cover to cause said rotation of said second lever within a predetermined angle to thereby rotate said shaft and said first lever; and
 means provided in a saw blade housing for restricting said rotation of said second lever within said predetermined angle;
 the other end of said first lever being engageable with said limit switch upon rotation in one direction and disengageable therefrom upon rotation in the opposite direction.

5. The invention of claim 4 wherein said second lever is made of elastic material and maintains said frictional contact between said elastic member and said safety cover.

6. The invention of claim 4 wherein said restricting means comprises a pair of stoppers between which said second lever is interposed, said second lever being adapted to abut against one of said stoppers upon said rotation of said first lever in said one direction and the other stopper upon said rotation of said first lever in said opposite direction.

7. The invention of claim 3 wherein said last named means comprises:
 a shaft supported by a saw blade housing rotatably about its own axis;
 a pin secured at one end to one end of said shaft for rotation therewith;
 a lever secured in its mid-portion to the other end of said shaft for rotation with said safety cover in a direction opposite thereto, said lever being generally parallel to said pin and having one end extending in a generally diametrically opposite direction from said pin with respect to said shaft;
 a member of elastic material secured to said one end of said lever and maintained in frictional contact with said safety cover to cause said rotation of said lever within a predetermined angle to thereby rotate said shaft and said pin; and
 means provided in said saw blade housing for restricting said rotation of said lever within said predetermined angle;
 the other end of said pin being disengageable from said limit switch upon rotation in one direction and engageable therewith upon rotation in the opposite direction.

8. The invention of claim 7 wherein said elastic member is a rubber pin, and wherein said one end of said lever includes a substantially cylindrical, coaxially extending portion, said rubber pin being secured in said cylindrical portion and projecting therefrom at one end, said one end of said rubber pin being maintained in frictional contact with said safety cover.

9. The invention of claim 7 wherein said restricting means comprises a stopper provided in said saw blade housing and cooperating with a bottom inner wall portion of a handle on said saw to restrict said rotation of said lever within said predetermined angle, the other end of said lever being adapted to abut against said stopper upon said rotation of said pin in said opposite direction, and said other end of said pin being adapted to abut against said bottom inner wall portion upon said rotation of said pin in said one direction.

10. The invention of claim 9 wherein said lever is generally L-shaped and includes a projection on said other end thereof for abutment against said stopper.

* * * * *